United States Patent
Kanamori et al.

(10) Patent No.: US 9,044,728 B2
(45) Date of Patent: Jun. 2, 2015

(54) OZONE GENERATING ELEMENT AND METHOD FOR MANUFACTURING OZONE GENERATING ELEMENT

(71) Applicant: Murata Manufacturing Co., Ltd., Nagaokakyo-shi, Kyoto-fu (JP)

(72) Inventors: Tetsuo Kanamori, Nagaokakyo (JP); Yukihiro Yagi, Nagaokakyo (JP); Takahiro Takada, Nagaokakyo (JP); Toshiyuki Miyamoto, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 106 days.

(21) Appl. No.: 13/762,418

(22) Filed: Feb. 8, 2013

(65) Prior Publication Data

US 2013/0209323 A1 Aug. 15, 2013

(30) Foreign Application Priority Data

Feb. 14, 2012 (JP) ................. 2012-029511

(51) Int. Cl.
*B01J 19/08* (2006.01)
*C01B 13/11* (2006.01)

(52) U.S. Cl.
CPC ............. *B01J 19/087* (2013.01); *C01B 13/11* (2013.01); *C01B 2201/10* (2013.01); *C01B 2201/22* (2013.01); *C01B 2201/32* (2013.01); *C01B 2201/62* (2013.01); *C01B 2201/64* (2013.01)

(58) Field of Classification Search
CPC .... B01J 19/087; C01B 13/11; C01B 2201/10; C01B 2201/22; C01B 2201/32; C01B 2201/62; C01B 2201/64

USPC .......................................... 422/186.04, 186.07
See application file for complete search history.

(56) References Cited

U.S. PATENT DOCUMENTS

| | | | | |
|---|---|---|---|---|
| 5,407,639 A | * | 4/1995 | Watanabe et al. | 422/186.07 |
| 6,039,816 A | * | 3/2000 | Morita et al. | 134/19 |
| 6,040,055 A | * | 3/2000 | Baba et al. | 428/428 |
| 2004/0201946 A1 | * | 10/2004 | Iwamatsu | 361/230 |
| 2005/0231884 A1 | * | 10/2005 | Miyaishi et al. | 361/231 |
| 2009/0003859 A1 | * | 1/2009 | Kagawa et al. | 399/50 |

FOREIGN PATENT DOCUMENTS

| | | |
|---|---|---|
| CN | 1171029 A | 1/1998 |
| CN | 2380555 Y | 5/2000 |
| CN | 2594250 Y | 12/2003 |
| JP | 64-042306 A | 2/1989 |

(Continued)

OTHER PUBLICATIONS

Official Communication issued in corresponding Japanese Patent Application No. 2012-029511, mailed on Dec. 17, 2013.

(Continued)

*Primary Examiner* — Kishor Mayekar
(74) *Attorney, Agent, or Firm* — Keating & Bennett, LLP

(57) ABSTRACT

An ozone generating element includes a laminated body including stacked dielectric layers. A discharge electrode is provided on a first of the dielectric layers. An induction electrode is provided on a second of the dielectric layers that is opposed to the discharge electrode with the first dielectric layer interposed therebetween. A protective layer is arranged on the first dielectric layer so as to cover the discharge electrode, and includes a glass ceramic.

18 Claims, 3 Drawing Sheets

(56) References Cited

FOREIGN PATENT DOCUMENTS

| | | |
|---|---|---|
| JP | 9-100104 A | 4/1997 |
| JP | 2003-327416 A | 11/2003 |
| JP | 2003-327419 A | 11/2003 |
| JP | 2008-108720 A | 5/2008 |
| JP | 2009-029647 A | 2/2009 |

OTHER PUBLICATIONS

Official Communication issued in corresponding German Patent Application No. 10 2013 202 344.8, mailed on May 6, 2014.
Official Communication issued in corresponding Chinese Patent Application No. 2013100472332, mailed on Jun. 4, 2014.

* cited by examiner

OZONE GENERATING ELEMENT AND METHOD FOR MANUFACTURING OZONE GENERATING ELEMENT

BACKGROUND OF THE INVENTION

1. Field of the Invention

The present invention relates to an ozone generating element and a method for manufacturing the ozone generating element, and more particularly, to an ozone generating element that generates ozone from oxygen by electric discharge and a method for manufacturing the ozone generating element.

2. Description of the Related Art

The ozone generating element disclosed in, for example, Japanese Patent Application Laid-Open No. 2009-29647 is known as a conventional ozone generating element. The ozone generating element has a discharge electrode and an induction electrode opposed with a dielectric substrate interposed therebetween. The discharge electrode and the induction electrode are each covered with a protective film composed of glass. In the case of the thus configured ozone generating element, a high alternating-current voltage is applied between the discharge electrode and the induction electrode to generate electric discharge around the discharge electrode. Thus, ozone is generated from an oxygen around the discharge electrode In the case of the ozone generating element disclosed in Japanese Patent Application Laid-Open No. 2009-29647, the temperature of the discharge electrode is increased during electric discharge. The protective film composed of glass is degraded by the increased temperature of the discharge electrode, because glass has only relatively low heat resistance. As a result, the ozone generating element disclosed in Japanese Patent Application Laid-Open No. 2009-29647 undergoes carbonization of the discharge electrode to decrease the amount of ozone generation.

SUMMARY OF THE INVENTION

Therefore, preferred embodiments of the present invention provide an ozone generating element that significantly reduces and prevents a decrease in the amount of ozone generation due to degradation of a protective layer, and a method for manufacturing the ozone generating element.

An ozone generating element according to a preferred embodiment of the present invention includes a dielectric layer; a discharge electrode provided on the dielectric layer; an induction electrode opposed to the discharge electrode with the dielectric layer interposed therebetween; and a protective layer arranged on the dielectric layer to cover the discharge electrode, and including a glass ceramic.

A method for manufacturing the ozone generating element according to another preferred embodiment of the present invention includes a step of co-firing of the dielectric layer with the protective layer.

According to various preferred embodiments of the present invention, the decrease in the amount of ozone generation due to degradation of the protective layer is significantly reduced and prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

An ozone generating element and a manufacturing method therefor according to preferred embodiments of the present invention will be described below.

Figure 1:
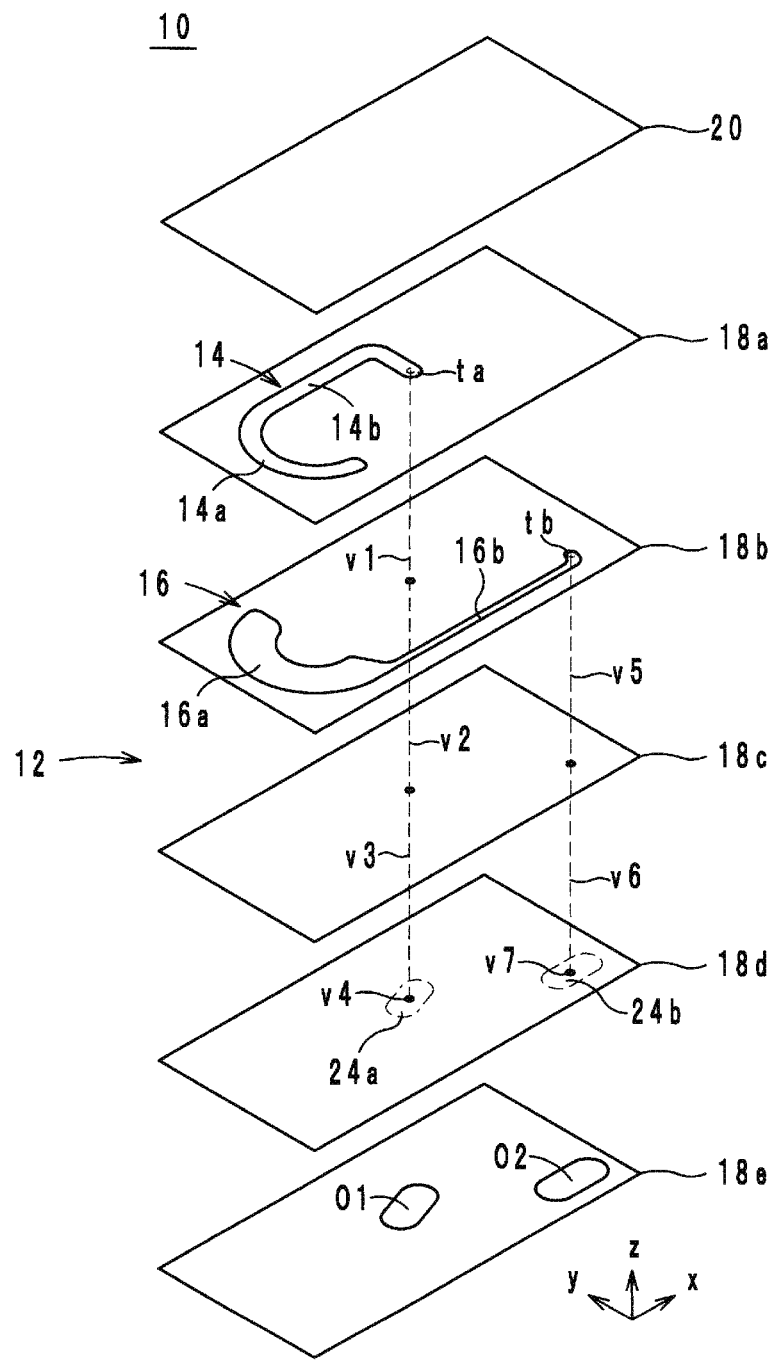
FIG. 1 is an exploded perspective view of an ozone generating element according to a preferred embodiment of the present invention.

The configuration of an ozone generating element according to a preferred embodiment will be described below with reference to FIG. 1, which is an exploded perspective view of an ozone generating element 10. In FIG. 1, the stacking direction is defined as a z-axis direction, and in the case of planar view from the z-axis direction, the direction in which the long side of the ozone generating element 10 extends is defined as an x-axis direction, whereas the direction in which the short side of the ozone generating element 10 extends is defined as a y-axis direction.

The ozone generating element 10 is preferably used for air conditioners, air cleaners, etc. which have an air freshener function or a microbicidal function, for example. As shown in FIG. 1, the ozone generating element 10 includes a laminated body 12, a discharge electrode 14, an induction electrode 16, a protective layer 20, external electrodes 24a and 24b, and via hole conductors v1 to v7.

The laminated body 12 is a rectangular or substantially rectangular substrate including a glass ceramic, and preferably, an LTCC substrate. A non-limiting example of materials for the LTCC substrate is a glass ceramic including a mixture of $CaO$—$Al_2O_3$—$SiO_2$—$B_2O_3$ glass with an $Al_2O_3$ filler. The laminated body 12 preferably includes rectangular or substantially rectangular dielectric layers 18 (18a to 18e) stacked so as to be arranged in this order from the positive to negative direction in the z-axis direction. The dielectric layer 18 preferably has a thickness of, for example, about 50 μm or more and about 250 μm or less. In the present preferred embodiment, the dielectric layer 18 preferably has a thickness of about 130 μm, for example.

The discharge electrode 14 is provided on the surface of the dielectric layer 18a, and is a linear conductor layer preferably including a conductor material such as silver, copper, palladium, and a ruthenium oxide. The discharge electrode 14 includes an opposed portion 14a and a connected portion 14b as shown in FIG. 1. The opposed portion 14a defines a circular arc which has a length of a semi-perimeter projecting toward the negative direction in the x-axis direction. The connected portion 14b preferably is L shaped or substantially L shaped, which is connected to a more positive end of the opposed portion 14a in the y-axis direction. More specifically, the connected portion 14b extends from the more positive end of the opposed portion 14a in the y-axis direction toward the positive direction in the x-axis direction, and further bends toward the negative direction in the y-axis direction. The end to of the connected portion 14b, which is opposite to the end connected to the opposed portion 14a, is located near the intersection of the diagonal lines on the dielectric layer 18a. In addition, the discharge electrode 14 preferably has a thickness of, for example, about 5 μm or more and about 20 μm or less. In the present preferred embodiment, the discharge electrode 14 preferably has a thickness of about 10 μm, for example.

The induction electrode 16 is provided on the surface of the dielectric layer 18b, and is a linear conductor layer including a conductor material such as silver, copper, palladium, and a ruthenium oxide. The induction electrode 16 includes an opposed portion 16a and a connected portion 16b as shown in FIG. 1. The opposed portion 16a defines a circular arc which has a length for the semi-perimeter projecting toward the negative direction in the x-axis direction. The opposed portion 16a of the induction electrode 16 is opposed to the opposed portion 14a of the discharge electrode 14 with the dielectric layer 18a interposed therebetween. In addition, the line width of the opposed portion 16a is thicker than the line width of the opposed portion 14a. Thus, the opposed portion 16a encompasses the opposed portion 14a in planar view from the z-axis direction. The connected portion 16b which is connected to a more negative end of the opposed portion 16a in the y-axis direction, extends from the end toward the positive direction in the x-axis direction. The end tb of the connected portion 16b, which is opposite to the end connected to the opposed portion 16a, is located near a corner of the dielectric layer 18b in the positive direction of the x-axis direction and in the negative direction of the y-axis direction. In addition, the induction electrode 16 preferably has a thickness of, for example, about 5 μm or more and about 20 μm or less. In the present preferred embodiment, the induction electrode 16 preferably has a thickness of about 10 μm, for example.

The external electrode 24a provided on the rear surface of the dielectric layer 18d preferably has an elliptical or substantially elliptical shape. The external electrode 24a is located near the intersection of the diagonal lines on the dielectric layer 18d. Thus, the external electrode 24a has an overlap with the end to of the connected portion 14b in planar view from the z-axis direction. The external electrode 24a is a conductor layer including a conductor material such as silver, copper, palladium, and a ruthenium oxide. In addition, the surface of the external electrode 24a is coated with a high-resistance paste including a ruthenium oxide for the purpose of corrosion prevention. It is to be noted that while plating such as nickel plating and tin plating may be used for corrosion prevention, the resistive paste is preferred because there is a possibility that the amount of ozone generation will be decrease in the case of plating.

The external electrode 24b provided on the rear surface of the dielectric layer 18d preferably has an elliptical or substantially elliptical shape. The external electrode 24b is located near a corner of the dielectric layer 18d in the positive direction of the x-axis direction and in the negative direction of the y-axis direction. Thus, the external electrode 24b has an overlap with the end tb of the connected portion 16b in planar view from the z-axis direction. The external electrode 24b is a conductor layer including a conductor material such as silver, copper, palladium, and a ruthenium oxide. In addition, the surface of the external electrode 24b is coated with nickel plating and tin plating for the purpose of corrosion prevention.

The dielectric layer 18e is provided with openings O1 and O2. The openings O1 and O2 respectively have overlaps with the external electrodes 24a and 24b in planar view from the z-axis direction. Thus, the external electrodes 24a and 24b are exposed to the outside from the principal surface of the laminated body 12 in the negative direction of the z-axis direction.

The via hole conductors v1 to v4 respectively penetrating through the dielectric layers 18a to 18d in the z-axis direction are connected to each other to constitute one via hole conductor. The via hole conductors v1 to v4 connect the end to of the connected portion 14b to the external electrode 24a. Thus, the discharge electrode 14 is connected to the external electrode 24a. The via hole conductors v1 to v4 are prepared by filling via holes provided in the dielectric layers 18a to 18d with a conductor material such as silver, copper, palladium, and a ruthenium oxide.

The via hole conductors v5 to v7 respectively penetrating through the dielectric layers 18b to 18d in the z-axis direction are connected to each other to constitute one via hole conductor. The via hole conductors v5 to v7 connect the end tb of the connected portion 16b to the external electrode 24b. Thus, the induction electrode 16 is connected to the external electrode 24b. The via hole conductors v5 to v7 are prepared by filling via holes provided in the dielectric layers 18b to 18d with a conductor material such as silver, copper, palladium, and a ruthenium oxide.

The protective layer 20, which is a layer including a glass ceramic arranged on the dielectric layer 18a so as to cover the entire discharge electrode 14, and serves to prevent the discharge electrode 14 from being carbonized and from being peeled from the laminated body 12. The protective layer 20 which preferably has the same rectangular or substantially rectangular shape as the dielectric layer 18, is stacked on the dielectric layer 18a in the positive direction of the z-axis direction. In addition, the protective layer 20 preferably includes the same material as the dielectric layer 18, and for example, preferably includes a glass ceramic of a mixture of $CaO$—$Al_2O_3$—$SiO_2$—$B_2O_3$ glass with an $Al_2O_3$ filler. The protective layer 20 preferably has a thickness of about 30 μm or more and about 150 μm or less, for example.

In the thus configured ozone generating element 10, a high alternating-current voltage is applied between the external electrodes 24a and 24b. Examples of this high alternating-current voltage include, for example, an alternating-current voltage with a peak-to-peak value of about 6 kV to about 7 kV at a frequency of about 40 kHz to about 70 kHz. When the high alternating-current voltage is applied between the external electrodes 24a and 24b, a strong electric field is generated in synchronization with the alternating-current cycle of the high alternating-current voltage near the outer edge of the discharge electrode 14. In this case, the following are developed repeatedly: the phenomenon of emitting electrons from the vicinity of the outer edge of the discharge electrode 14 and donating the electrons to the laminated body 12; and the phenomenon of returning the electrons from the laminated body 12 to the discharge electrode 14. Thus, electrical discharges are generated around the discharge electrode 14, and electric discharges from an oxygen passing near the discharge electrode 14 generate ozone near the surface of the laminated body 12.

Next, a non-limiting example of a method for manufacturing the ozone generating element 10 will be described with reference to FIG. 1. It is to be noted that while a method for manufacturing the single ozone generating element 10 will be described below, a plurality of laminated bodies is preferably prepared at the same time in practice by stacking large-size mother ceramic green sheets to prepare a mother laminated body, and further cutting the mother laminated body.

First, ceramic green sheets to define the dielectric layers 18 and the protective layer 20 are prepared.

Specifically, glass ceramic slurry is prepared which is preferably including a mixture of $CaO$—$Al_2O_3$—$SiO_2$—$B_2O_3$ glass powder with an $Al_2O_3$ filler. Then, the obtained glass ceramic slurry is formed by a doctor blade method into sheets on a PET carrier film, and dried to prepare ceramic green sheets to define the dielectric layers 18 and the protective layer 20.

Next, the via hole conductors v1 to v7 are formed in each of the ceramic green sheets to define the dielectric layers 18a to 18d. Specifically, the ceramic green sheets to define the dielectric layers 18a to 18d are irradiated with laser beams to form via holes. Furthermore, the via holes are filled by a method such as a printing application with a paste containing a conductor material such as silver, copper, palladium, and a ruthenium oxide to form the via hole conductors v1 to v7.

Next, the ceramic green sheet to define the dielectric layer 18e is subjected to punching with the use of a punch or the like to form the openings O1 and O2.

Next, as shown in FIG. 1, a paste including a conductive material is applied by a screen printing method onto the surfaces of the ceramic green sheets to define the dielectric layers 18a and 18b so as to form the discharge electrode 14 and the induction electrode 16. The paste including a conductive material is, for example, a metal powder such as a silver powder, a copper powder, a palladium powder, or a ruthenium oxide powder, with a varnish and a solvent added thereto.

Next, as shown in FIG. 1, a paste including a conductive material is applied by a screen printing method onto the rear surface of the ceramic green sheet to define the dielectric layer 18d so as to form silver electrodes or copper electrodes to define the external electrodes 24a and 24b. The paste including a conductive material is, for example, a silver powder or a copper powder with a varnish and a solvent added thereto.

Next, the ceramic green sheets to define the protective layer 20 and the dielectric layers 18a to 18e are stacked and subjected to tentative pressure bonding one by one so as to be arranged in this order from the positive to negative direction in the z-axis direction so as to form an unfired mother laminated body. After this, the mother laminated body is subjected to thermocompression bonding to carrying main pressure bonding.

Next, the mother laminated body is cut into separate unfired laminated bodies 12.

Next, the unfired laminated bodies 12 are subjected to a binder removal treatment and firing. Thus, the dielectric layers 18 and the protective layer 20 are subjected to co-firing.

Finally, a high-resistance paste including a ruthenium oxide is applied onto the surface of the silver electrodes or copper electrodes to define the external electrodes 24a and 24b, and subjected to firing to form the external electrodes 24a and 24b. The ozone generating element 10 is completed in accordance with the steps described above.

The ozone generating element 10 configured as described above can significantly reduce and prevent decreases in the amount of ozone generation due to degradation of the protective layer 20. More specifically, in the case of the ozone generating element disclosed in Japanese Patent Application Laid-Open No. 2009-29647, the temperature of the discharge electrode is increased during electric discharge. The protective film including glass is degraded by the increased temperature of the discharge electrode, because glass has only relatively low heat resistance. As a result, the ozone generating element disclosed in Japanese Patent Application Laid-Open No. 2009-29647 undergoes carbonization of the insufficiently protected discharge electrode to decrease the amount of ozone generation.

On the other hand, the ozone generating element 10 has the protective layer 20 including the glass ceramic. The glass ceramic has excellent heat resistance as compared with glass. Therefore, the protective layer 20 including the glass ceramic is less likely to be degraded during electric discharge, as compared with protective films including glass. As a result, the ozone generating element 10 prevents the carbonization of the discharge electrode 14 to significantly reduce and prevent the decrease in the amount of ozone generation.

In addition, the ozone generating element 10 can significantly reduce and prevent decreases in the amount of ozone generation due to degradation of the protective layer 20, also for the following reason. More specifically, as the proportion of glass contained in the protective layer is increased, the conductor material in the discharge electrode is more likely to diffuse into the protective layer. Therefore, in the case of the ozone generating element disclosed in Japanese Patent Application Laid-Open No. 2009-29647, the conductor material is more likely to diffuse into the protective layer including glass.

Therefore, the protective layer is more likely to be degraded in the case of the ozone generating element disclosed in Japanese Patent Application Laid-Open No. 2009-29647. In particular, when the conductor material contains silver, the conductor material is more likely to diffuse into the protective layer.

On the other hand, the ozone generating element 10 includes the protective layer 20 including the glass ceramic. Therefore, the proportion of the glass contained in the protective layer 20 is lower than the proportion of the glass contained in the protective layer disclosed in Japanese Patent Application Laid-Open No. 2009-29647. Therefore, the conductor material of the discharge electrode 14 is less likely to diffuse into the protective layer 20. Accordingly, in the case of the ozone generating element 10, the discharge electrode 14 is less likely to be degraded.

In addition, in the case of the ozone generating element 10, it is possible to reduce the number of manufacturing steps. More specifically, in the case of the ozone generating element disclosed in Japanese Patent Application Laid-Open No. 2009-29647, the protective film is composed of the poorly heat-resistance glass. Thus, the firing temperature for the protective film is lower than the firing temperature for the discharge electrode and the induction electrode. Therefore, firing for the discharge electrode and the induction electrode and firing for the protective film have to be carried out in separate steps.

On the other hand, the ozone generating element 10 includes the protective layer 20 including the glass ceramic which has excellent heat resistance. Therefore, the firing temperature for the protective layer 20 can be made close to the firing temperature for the discharge electrode 14 and the induction electrode 16. This allows the discharge electrode 14, the induction electrode 16, and the protective layer 20 to be subjected to co-firing. As a result, it becomes possible to reduce the number of steps for manufacturing the ozone generating element 10.

In addition, in the case of the ozone generating element 10, because of the use of the glass ceramic as the dielectric layers 18, inexpensive materials such as silver and copper are used for the discharge electrode 14, the induction electrode 16, the external electrodes 24a and 24b, and the via hole conductors v1 to v7, rather than expensive materials such as platinum and gold. Therefore, the manufacturing cost of the ozone generating element 10 is reduced.

In addition, in the case of the ozone generating element 10, the dielectric layers 18 preferably have a thickness of about 50 μm or more and about 250 μm or less, and it is thus possible to drive the element at relatively low applied voltages. The relatively low applied voltages refer to, for example, applied voltages with a peak-to-peak value of about 8 kV or less.

The inventor carried out first, second and third experiments described below in order to clarify the effects achieved by the ozone generating element 10. In the first experiment, five samples were prepared for each of the first sample of the ozone generating element 10 and the second sample of an ozone generating element according to a comparative example as described below. Then, the unused first and second samples were driven to examine the relationship between the elapsed time and ozone concentration.

Figure 2:
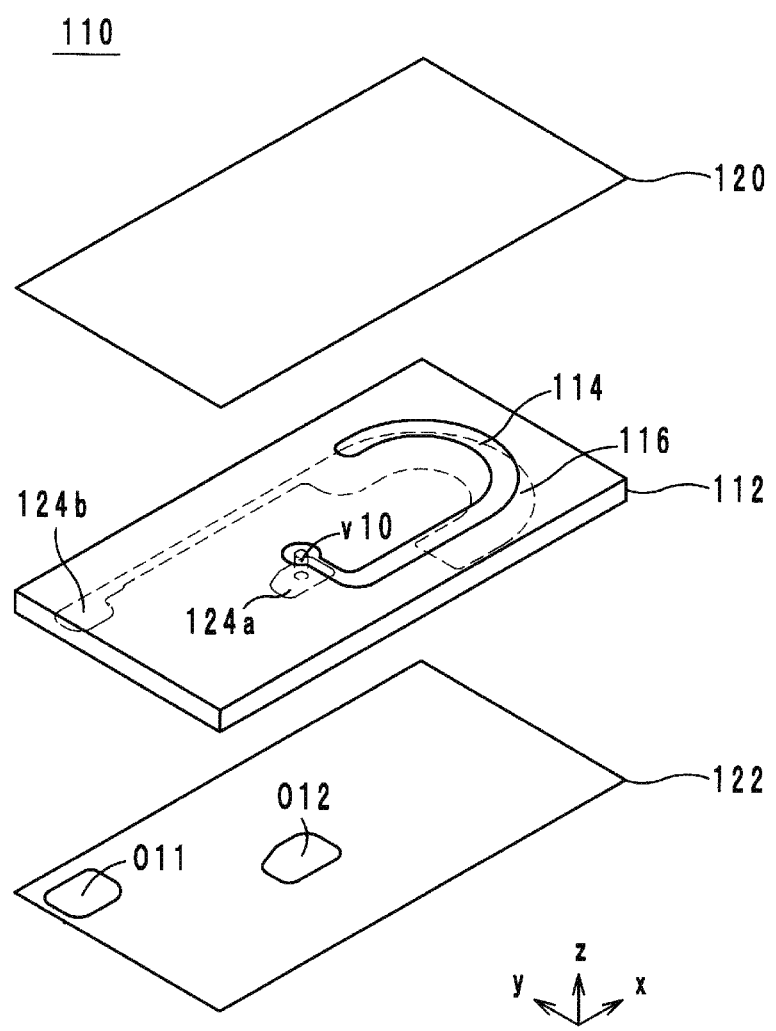
FIG. 2 is an exploded perspective view of an ozone generating element according to a comparative example.

First, the ozone generating element according to the comparative example will be described with the reference to the drawing. FIG. 2 is an exploded perspective view of an ozone generating element 110 according to the comparative example. In FIG. 2, the normal direction from the ozone generating element 110 is defined as a z-axis direction, and in the case of planar view from the z-axis direction, the direction in which the long side of the ozone generating element 110 extends is defined as an x-axis direction, whereas the direction in which the short side of the ozone generating element 110 extends is defined as a y-axis direction.

The ozone generating element 110 includes a dielectric substrate 112, a discharge electrode 114, an induction electrode 116, protective layers 120 and 122, external electrodes 124a and 124b, and a via hole conductor v10. The dielectric substrate 112 is a rectangular alumina substrate. The discharge electrode 114 which preferably has the same shape as the discharge electrode 14, is provided on the principal surface of the dielectric substrate 112 in the positive direction of the z-axis direction. The induction electrode 116 which preferably has the same shape as the induction electrode 16, is provided on the principal surface of the dielectric substrate 112 in the negative direction of the z-axis direction.

The external electrode 124a is provided near the intersection of the diagonal lines on the principal surface of the dielectric substrate 112 in the negative direction of the z-axis direction. The via hole conductor v10 penetrating through the dielectric substrate 112 in the z-axis direction connects the discharge electrode 114 to the external electrode 124a.

The external electrode 124b is provided on the principal surface of the dielectric substrate 112 in the negative direction of the z-axis direction, and connected to the induction electrode 116.

The protective layer 120 is a dielectric layer including rectangular or substantially rectangular glass covering the entire discharge electrode 114. The protective layer 120 is stacked on the principal surface of the dielectric substrate 112 in the positive direction of the z-axis direction.

The protective layer 122 is a dielectric layer including rectangular or substantially rectangular glass covering the entire induction electrode 116. The protective layer 122 is stacked on the principal surface of the dielectric substrate 112 in the negative direction of the z-axis direction. In addition, the protective layer 122 is provided with openings O11 and O12. The external electrodes 124a and 124b are respectively exposed through the openings O11 and O12 to the outside.

The following are the experimental conditions.

Peak-to-Peak of Applied Voltage: 6.5 kV, Frequency of Applied Voltage: 60 Hz, Measurement of Ozone Concentration: measured with an ozone concentration meter (EG-3000 from Ebara Jitsugyo Co., Ltd.) by putting the sample in a syringe and sucking ozone at a rate of 1.5 L/min.

Figure 3:
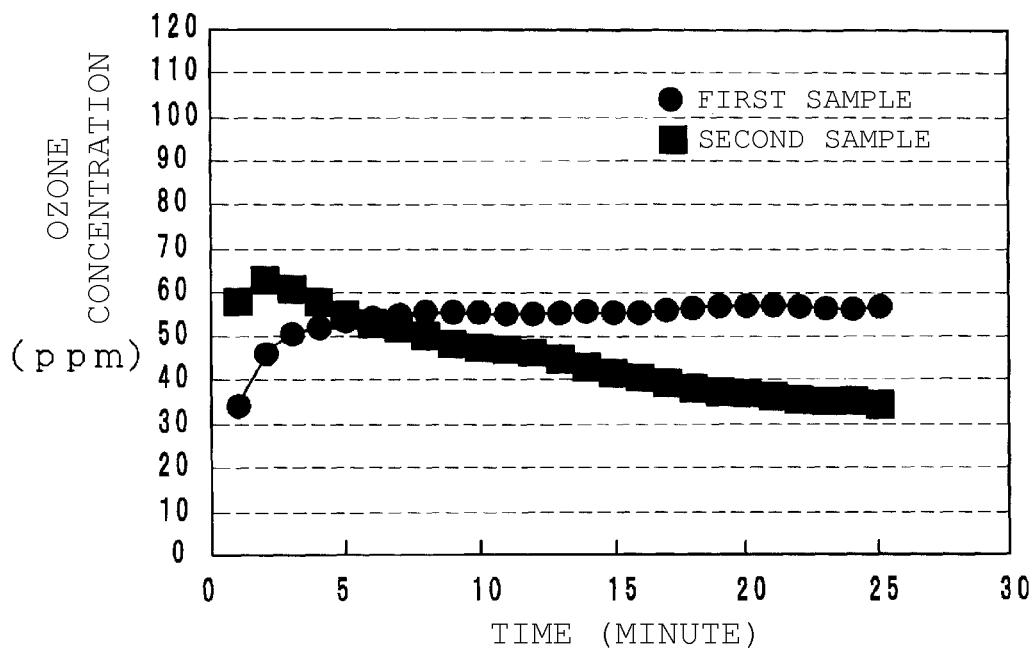
FIG. 3 is a graph showing the result of a first experiment.

FIG. 3 is a graph showing the result of the first experiment. The vertical axis indicates an ozone concentration, whereas the horizontal axis indicates time. The graph of FIG. 3 shows that the average of the ozone concentration for the five first samples and the average of the ozone concentration for the five second samples.

FIG. 3 shows that the ozone concentration is decreased with time in the case of the second sample. This is considered to be because the protective layer 120 is degraded to carbonize the discharge electrode 114.

On the other hand, the amount of ozone is not substantially changed even with time in the case of the first sample. This is considered to be because degradation of the protective layer 20 is significantly reduced to prevent carbonization of the discharge electrode 14. Thus, it is determined that the use of the glass ceramic for the material of the protective layer 20 significantly reduces and prevents the decrease in the amount of ozone generation in the case of the ozone generating element 10.

Next, the inventor drove the first sample and the second sample at ordinary temperature to carry out a durability test as the second experiment. The following are the experimental conditions for the durability test.

Temperature: 20° C. to 30° C., Humidity: 20% RH to 70% RH, Peak-to-Peak of Applied Voltage: 6.5 kV, Frequency of Applied Voltage: 60 Hz The inventor repeated the cycle of applying an applied voltage to the first and second samples for 50 seconds and then stopping the application of the applied voltage for 10 seconds. As a result, the second sample failed to generate ozone due to the discharge electrode 114 carbonized and burnt in the durability test for 1000 hours. On the other hand, the first sample continued to generate ozone without carbonization of the discharge electrode 14 even in the durability test for 2000 hours. Thus, it is determined that the ozone generating element 10 has high durability because of the protective layer 20 including the glass ceramic.

Next, the inventor carried out the third experiment described below in order to check the appropriate range of the protective layer 20 in thickness. Specifically, the inventor prepared a third sample with the protective layer 20 of 30 μm in thickness, a fourth sample with the protective layer 20 of 100 μm in thickness, a fifth sample with the protective layer 20 of 150 μm in thickness, and a sixth sample with the protective layer 20 of 200 μm in thickness. The thickness of the protective layer 20 was measured with an optical microscope after the substrate was cut with a dicer, then fixed in a resin, and polished to expose the cross portion. Then, the peak-to-peak value of the applied voltage at which ozone was generated was checked for the third to sixth samples. The experimental results are shown below.

Third Sample: 4 kV, Fourth Sample: 6 kV, Fifth Sample: 8 kV, Sixth Sample: 11.5 kV As described above, it has been confirmed that the application of the applied voltage from about 4 kV to about 11.5 kV generates ozone in the case of the third to sixth samples. However, from the perspective of designing the driving circuit of the ozone generating element 10, it is preferable to drive the ozone generating element 10 at an applied voltage with the peak-to-peak value of about 10 kV or less. Therefore, the protective layer 20 preferably has a thickness of about 150 μm or less, for example.

Figure 4:
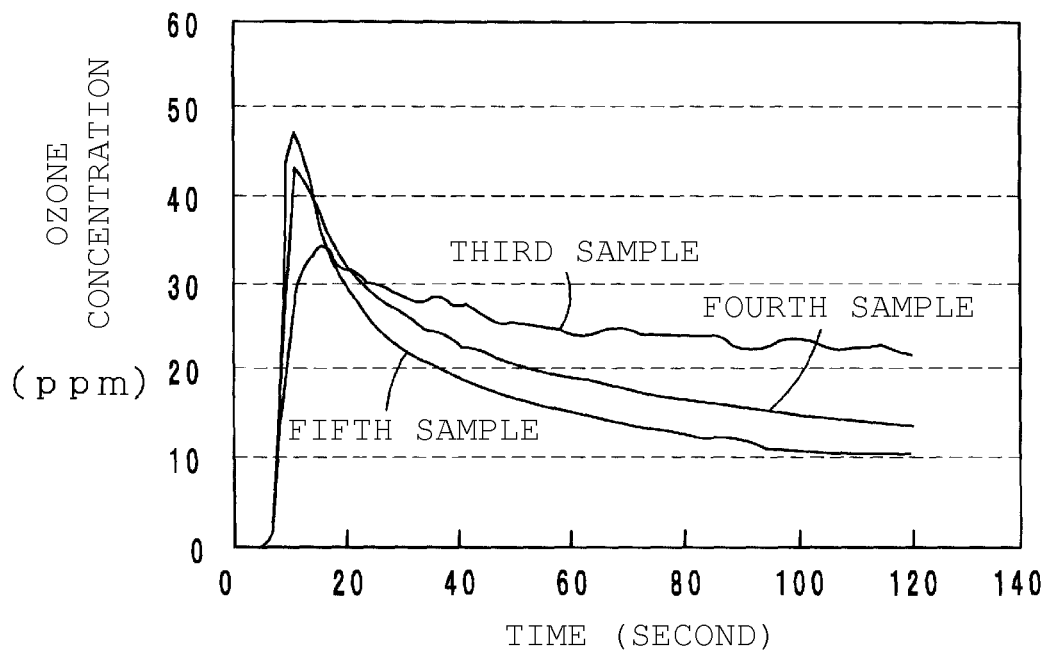
FIG. 4 is a graph showing the result of a third experiment.

FIG. 4 is a graph showing the result of the third experiment. The vertical axis indicates an ozone concentration, whereas the horizontal axis indicates time. It can be seen from FIG. 4 that the ozone concentration is increased as the protective layer 20 is smaller in thickness. Therefore, the protective layer 20 is preferably thinner. The third experiment succeeded in confirming that the ozone generating element 10 operates without problems as long as the protective layer 20 has a thickness of about 30 μm or more. Therefore, the protective layer 20 preferably has a thickness of about 30 μm or more. It is to be noted that it was determined that it was difficult to continue the measurement with this circuit design for the samples because of the high initial applied voltage for the sixth sample, and the measurement was stopped. For that reason, FIG. 4 shows no graph for the sixth sample.

Other Preferred Embodiments

The ozone generating element and manufacturing method therefor according to the present invention are not limited to the ozone generating element 10 and manufacturing method therefor according to the preferred embodiments described above, and can be modified within the scope of the present invention.

It is to be noted that the ozone generating element 10 may use a dielectric substrate instead of the use of the laminated body 12 with the dielectric layers 18 stacked.

In addition, the ozone generating element 10 may have the dielectric layers 18 and protective layer 20 made of different materials. For example, the dielectric layers 18 and protective layer 20 may include different glass ceramic materials. Alternatively, the dielectric layers 18 may include alumina substrates, whereas the protective layer 20 may include a glass ceramic. However, when the dielectric layers 18 and the protective layer 20 are made of the same material, the increased adhesion between the dielectric layers 18 and the protective layer 20 can significantly reduce and prevent peeling, cracking, etc. caused at the interface.

As described above, preferred embodiments of the present invention are useful for ozone generating elements and methods for manufacturing the ozone generating elements, and excellent in, in particular, the ability to significantly reduce and prevent decreases in the amount of ozone generation due to degradation of the protective layer.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An ozone generating element comprising:
   a dielectric layer;
   a discharge electrode provided on the dielectric layer;
   an induction electrode opposed to the discharge electrode with the dielectric layer interposed therebetween; and
   a protective layer arranged on the dielectric layer to cover the discharge electrode, and including a glass ceramic; wherein
   the protective layer has a thickness of about 30 μm or more and about 150 μm or less.

2. The ozone generating element according to claim 1, wherein the dielectric layer includes a glass ceramic.

3. The ozone generating element according to claim 1, wherein the protective layer and the dielectric layer include at least one common material.

4. The ozone generating element according to claim 1, wherein the discharge electrode and the induction electrode include silver.

5. The ozone generating element according to claim 1, further comprising a laminated body including the dielectric layer and a plurality of other dielectric layers stacked on each other.

6. The ozone generating element according to claim 5, further comprising via hole conductors provided in the laminated body and external electrodes provided on the laminated body.

7. The ozone generating element according to claim 5, wherein the laminated body is a low temperature co-fired ceramic substrate including a glass ceramic.

8. The ozone generating element according to claim 1, wherein the dielectric layer has a thickness of about 50 μm or more and about 250 μm or less.

9. The ozone generating element according to claim 1, wherein the discharge electrode is a linear conductor layer.

10. The ozone generating element according to claim 1, wherein the discharge electrode includes an opposed portion that defines a circular or substantially circular arc and a connection portion that is L shaped or substantially L shaped.

11. The ozone generating element according to claim 1, wherein the discharge electrode has a thickness of about 5 μm or more and about 20 μm or less.

12. The ozone generating element according to claim 1, wherein the induction electrode is a linear conductor layer.

13. The ozone generating element according to claim 1, wherein the induction electrode includes an opposed portion that defines a circular or substantially circular arc and a connection portion.

14. The ozone generating element according to claim 1, further comprising external electrodes having an elliptical or substantially elliptical shape.

15. The ozone generating element according to claim 14, wherein the external electrodes include a conductor layer and a high-resistance paste on the conductor layer.

16. The ozone generating element according to claim 1, further comprising a dielectric substrate including the dielectric layer.

17. The ozone generating element according to claim 1, wherein the dielectric layer and the protective layer include different materials from one another.

18. The ozone generating element according to claim 1, wherein the dielectric layer is an alumina substrate.

* * * * *